(12) United States Patent
Yamashita et al.

(10) Patent No.: US 6,175,190 B1
(45) Date of Patent: Jan. 16, 2001

(54) DISCHARGE-LAMP LIGHTING CIRCUIT

(75) Inventors: Masayasu Yamashita; Hiroki Ishibashi, both of Shizuoka (JP)

(73) Assignee: Koito Manufacturing Co., Ltd., Tokyo (JP)

( * ) Notice: Under 35 U.S.C. 154(b), the term of this patent shall be extended for 0 days.

(21) Appl. No.: 09/521,854

(22) Filed: Mar. 9, 2000

(30) Foreign Application Priority Data

Mar. 11, 1999 (JP) .................................................. 11-064494

(51) Int. Cl.$^7$ .................................................. H05B 37/02
(52) U.S. Cl. .................. 315/127; 315/224; 315/308; 315/360
(58) Field of Search .................................. 315/127, 128, 315/308, DIG. 5, 360, 224

(56) References Cited

U.S. PATENT DOCUMENTS

| | | | |
|---|---|---|---|
| 4,538,095 | * 8/1985 | Nilssen | 315/244 |
| 5,068,570 | 11/1991 | Oda et al. | 315/128 |
| 5,629,588 | 5/1997 | Oda et al. | 315/308 |

FOREIGN PATENT DOCUMENTS 3-179694   8/1991   (JP) .
10-312896  11/1998  (JP) .

* cited by examiner

*Primary Examiner*—David Vu
(74) *Attorney, Agent, or Firm*—Sughrue, Mion, Zinn, Macpeak & Seas, PLLC

(57) ABSTRACT

A discharge-lamp lighting circuit 1 has a DC-AC converter that incorporates a full bridge circuit consisting of a plurality of pairs of switching devices. The discharge-lamp lighting circuit incorporates an anomaly detector for detecting an anomalous state of the lighting circuit, and a current detector for detecting whether or not an electric current flows in the full bridge circuit in a state where the operation of the lighting circuit is stopped owing to detection of an anomalous state of the lighting circuit by the anomaly detector. The discharge-lamp lighting circuit also includes a device-stage determining unit structured such that when a current has been detected by the current detector, a pair of switching devices, of the switching devices connecting the full bridge circuit and disposed in the higher stage, are switched on. Another pair of the switching devices, disposed in the lower stage are switched off. The discharge-lamp lighting circuit thus prevents generation of a short circuit current owing to an anomalous state of a switching device of the plurality of pairs of switching devices.

6 Claims, 5 Drawing Sheets

PRIOR ART

DISCHARGE-LAMP LIGHTING CIRCUIT

FIELD OF THE INVENTION

The present invention relates to a technique for preventing occurrence of an anomalous state of a discharge-lamp lighting circuit that incorporates DC-AC converting means having a full bridge type circuit structure composed of a plurality of pairs of switching devices. The anomalous state is caused from a passing current which flows when a switching device positioned in a higher stage has been ruptured because of a short circuit.

BACKGROUND OF THE INVENTION

A lighting circuit for a discharge lamp, such as a metal halide lamp, is known which incorporates a DC power source, a switching power source circuit, a DC-AC converting circuit and a start circuit. The switching power source circuit is formed into a DC-DC converter circuit using a DC chopper type or a flyback type circuit.

The DC-AC converting circuit for converting DC voltage into AC voltage (rectangular waves or the like) uses a known structure of a full bridge circuit having a plurality of pairs of switching devices (or switch devices). The structure causes two pairs of switching devices to be operated contradictorily to obtain alternating output.

FIG. 5 shows an equivalent circuit of an example of a conventional circuit structure. A lighting circuit 31 comprises a switching power source portion including a DC power source 32, an inductor 33, a switching device 34 (for example, a FET (Field Effect Transistor) or the like), and a full bridge circuit 36 (operating circuits for the devices are omitted from illustration) including four switching devices 35-1 to 35-4 (each of which is indicated with the symbol of a switch).

That is, the positive electrode of the DC power source 32 is connected to an end of the inductor 33. Another end of the inductor 33 is connected to the drain of an N-channel FET which is the switching device 34. The output voltage from the switching power source portion is supplied to the full bridge circuit 36. Note that the source of the FET is connected to a negative electrode of the DC power source 32. A signal transmitted from a control circuit (not shown) is supplied to the gate of the FET.

The switching devices constituting the full bridge circuit 36 are disposed in the higher and lower stages. The switching devices 35-1 and 35-3 are disposed in the upper stage, while the switching devices 35-2 and 35-4 are disposed in the lower stage. An end of the switching device 35-1 is connected to the inductor 33, while another end of the switching device 35-1 is connected to the switching device 35-2. An end of the switching device 35-3 is connected to the inductor 33, while another end of the switching device 35-3 is connected to the switching device 35-4. Note that a discharge lamp g has an end connected to a connection point A between the switching devices 35-1 and 35-2. Another end of the discharge lamp 37 is connected to a connection point B between the switching devices 35-3 and 35-4.

A portion of the terminals of the switching devices 35-2 and 35-4 disposed opposite to the connection point of the discharge lamp 37 are connected to the source of the FET through a shunt resistance 38 provided to detect an electric current of the discharge lamp 37.

In the lighting circuit 31, the output voltage from the switching power supply portion is controlled in response to a control signal supplied to the switching device 34 so as to be supplied to the full bridge circuit 36. In the full bridge circuit 36, combination of the switching devices 35-1 and 35-4 and that of switching devices 35-2 and 35-3 are constituted so as to contradictorily be switched. Thus, a rectangular AC output is supplied from each of the connection points A and B to the discharge lamp 37.

There is a great danger of the conventional circuit producing anomalous heat, smoke or fire if breakdown of the switching device occurs due to a short circuit owing to a passing current generated when either electrode of the discharge lamp encounters a ground fault.

A case will now be described in which a lighting circuit of a discharge lamp for a vehicle encounters a short circuit between either electrode of the discharge lamp and the car body. If short circuit occurs in an output stage of the full bridge circuit 36 as indicated with a two-dot chain line shown in FIG. 5, a passing current I undesirably flows through a route as indicated with a dashed line shown in FIG. 5 in a state where the switching devices 35-1 and 35-3 are switched on and the switching devices 35-2 and 35-4 are switched off.

The passing current I causes wasteful consumption of electric currents of the DC power source 32. What is worse, heat and fire can be produced by the switching devices 35-1 to 35-4 of the full bridge circuit 36. Therefore, the passing current I must be prevented.

To prevent generation of the passing current I, the passage for the electric current must be obstructed at the switching devices 35-1 and 35-3 in the higher stage. Therefore, it might easily be considered to employ a method of switching the switching devices 35-1 and 35-3 off.

In a state shown in FIG. 6, an occurrence of the passing current I can be prevented if the switching devices 35-1 and 35-3 in the higher stage are switched off and the switching devices 35-2 and 35-4 in the lower stage are switched on, and the operations of the switching devices 35-1 and 35-3 are always normal.

However, if the switching device 35-3 is ruptured because of a short circuit generated due to some reason, passing current I' undesirably flows through a route (the positive electrode of the DC power source 32 to the switching device 35-3 to the switching device 35-4 to the shunt resistance 36 to the negative electrode of the DC power source 32) indicated with a dashed line shown in FIG. 6.

To prevent generation of the passing currents I and I', a method must be employed to switch all of the switching devices 35-1 to 35-4 off. The conventional structure and control of such an operating circuit (a so-called "bridge driver) for the switching devices required to realize this state become too complicated. It leads to a fact that the cost is raised excessively. Also in the foregoing case, all of the switching devices 35-1 to 35-4 can be switched off only when each of the switching device is free of any anomaly.

SUMMARY OF THE INVENTION

Accordingly, an object of the present invention is to protect a circuit by preventing occurrence of a passing current caused from anomaly of a switching device of a plurality of pairs of switching devices configured as a full bridge circuit and disposed in a higher stage.

To solve the foregoing problems, according to one aspect of the present invention, there is provided a discharge-lamp lighting circuit incorporating a full bridge circuit having DC-AC converting means arranged to convert DC voltage into AC voltage and having a plurality of pairs of switching devices, the discharge-lamp lighting circuit comprising: anomaly detecting means for detecting an anomalous state of the lighting circuit; current detecting means for detecting whether or not an electric current is flowing in the full bridge circuit after the operation of the lighting circuit has been stopped because of detection of an anomalous state of the lighting circuit by the anomaly detecting means; and, device-state determining means for switching on switching devices of the plural pairs of the switching devices, configured as the full bridge circuit and positioned in a higher stage, and for switching off switching devices which are positioned in a lower stage.

The present invention is structured such that when an electric current which flows in the full bridge circuit is detected as a sign of a passing current, switching devices of the plurality of pairs of switching devices, configured as the full bridge circuit and disposed in the higher stage, are switched on. Moreover, the switching devices which are disposed in the lower stage are switched off. Thus, the route for the passing current can be obstructed.

BRIEF DESCRIPTION OF THE DRAWINGS

FIG. 2 schematically shows the structure of a switching power source portion, in which

Figure 1:
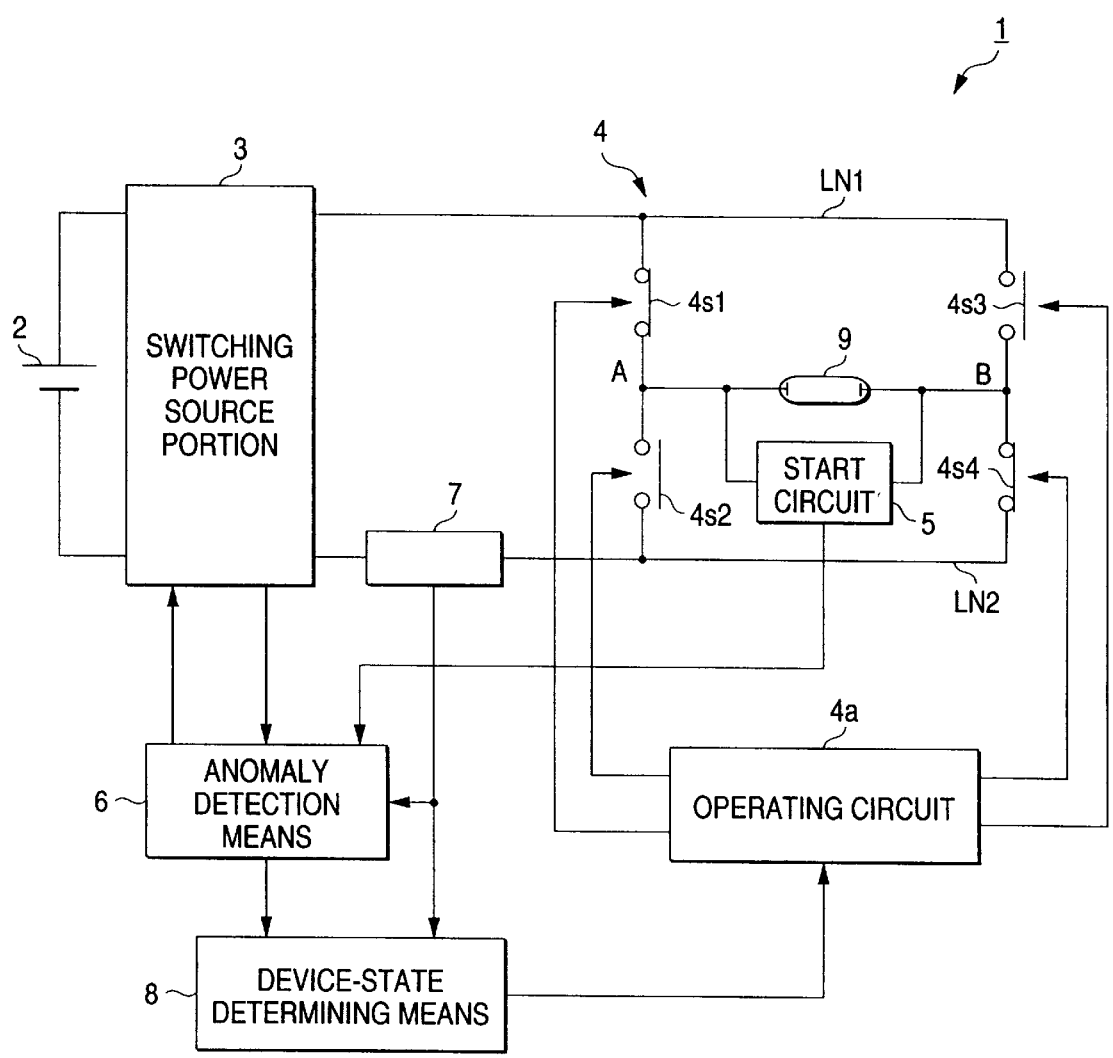
FIG. 1 is a block diagram of a circuit for use in a basic structure of the present invention.

Description of the Reference Numerals and Signs

| | |
|---|---|
| 1 | discharge-lamp lighting circuit |
| 4 | DC-AC converting means |
| 4si (i = 1 to 4) | switching device |
| 4s1, 4s3 | switching device in higher stage |
| 4s2, 4s4 | switching device in lower stage |
| 6 | anomalous detection means |
| 7 | current detection means |
| 8 | device-stage determining means |
| 12 | time measuring means |

PREFERRED EMBODIMENT OF THE INVENTION

FIG. 1 shows the basic structure of the invention which is constituted by a discharge-lamp lighting circuit 1 incorporating a DC power source 2, a switching power source portion 3, a DC-AC converter 4, a starting circuit 5, an anomaly detector 6, a current detector 7, and a device-stage determining circuit 8.

Figure 2A:
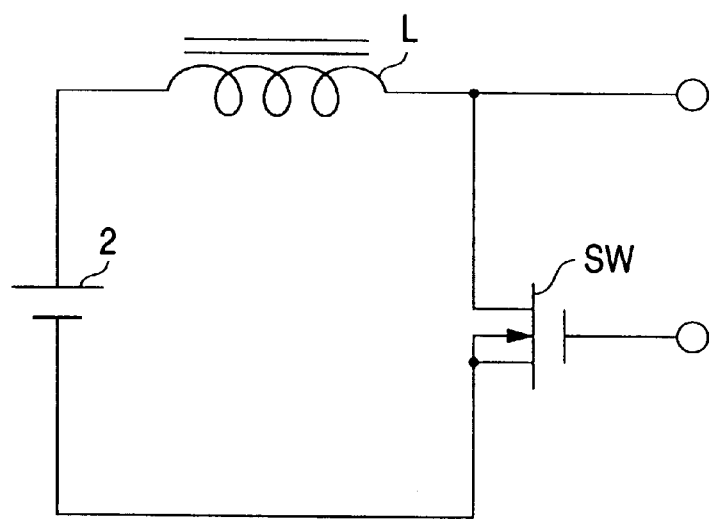
FIG. 2A shows a structure having an inductor L and a switching device SW in a DC power source and FIG. 2B shows a structure having a transformer T and a switching device SW in the DC power source.
Figure 2B:
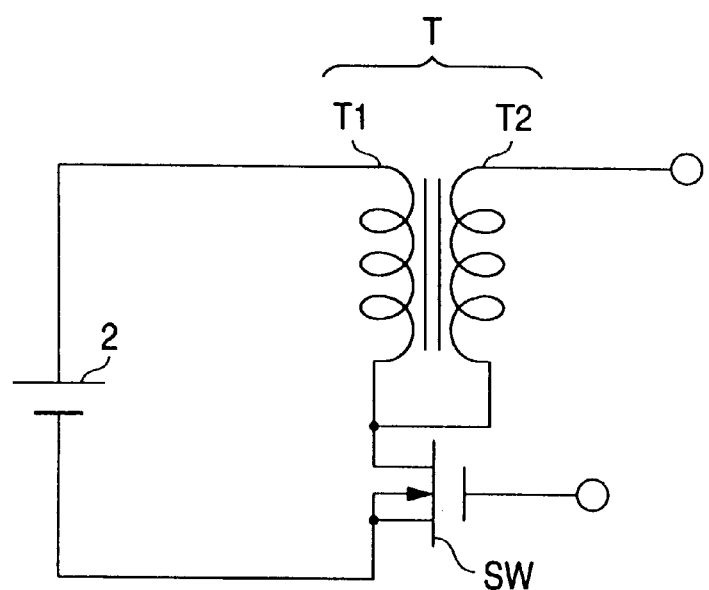

The switching power source portion 3 has a structure operative to serve as a DC (Direct Current)-DC (Direct Current) converter circuit. As schematically shown in FIG. 2A, a structure may be employed in which an inductor L and switching device SW are provided for the DC power source 2. As schematically shown in FIG. 2B, a structure in which a transformer T and a switching device SW are provided for the DC power source 2 may alternatively be employed.

That is, in the structure shown in FIG. 2A, an end of the inductor L is connected to the positive electrode of the DC power source 2. Moreover, another end of the inductor L is connected to the drain of an N-channel FET which is the switching device SW. The source of the FET is connected to the negative electrode of the DC power source 2. In the structure shown in FIG. 2B, an end of a primary coil T1 of the transformer T is connected to the positive electrode of the DC power source 2. Another end of the primary coil T1 is connected to the drain of the N-channel FET which is the switching device SW. An end of a secondary coil T2 of the transformer T is connected to an output terminal, while another end of T2 is connected to the drain of the FET. The source of the FET is connected to the negative electrode of the DC power source 2. In each of the structures, the input stage and the output stage of the DC power supply voltage are connected to each other in a DC manner (that is, the input stage and the output stage are not isolated from each other). The switching operation of the switching device SW is controlled (the operation for switching the switching device SW being controlled in response to a control signal supplied to the gate of the FET) in response to a signal transmitted from a known control circuit, not shown, the control circuit for controlling the electric power of the discharge lamp in response to a detection signal of the tube voltage of the discharge lamp or the tube current or a corresponding signal. The configuration allows the output voltage to be varied.

The DC-AC converter 4 converts the DC voltage to AC voltage and incorporates a plurality of pairs of the switching devices (field effect transistors). The switching devices constitute the full bridge circuit. FIG. 1 shows a structure that includes four semiconductor switching devices 4si (i=1, 2, 3 and 4), indicated with the symbol of a switch, disposed between output lines lN1 and lN2 of the switching power source portion 3. The devices 4s1 and 4s3 are disposed in the higher stage, while devices 4s2 and 4s4 are disposed in the lower stage.

That is, an end of the device 4s1 is connected to the output line LN1 in a state in which the device 4s1 and device 4s2 are connected to each other in series. A connection point A of the device 4s2, arranged to be connected to the device 4s1, is connected to the output line LN2. An end of the device 4s3 is connected to the output line LN1 in a state where the devices 4s3 and 4s4 are connected to each other in series. A terminal of the device 4s4 opposite to a connection point B arranged to be connected to the device 4s3 is connected to the output line LN2.

The switching devices 4si (i=1 to 4) are supplied with a control signal from an operating circuit (a bridge driver) 4a. A combination of devices 4s1 and 4s4 and a combination of 4s2 and 4s3 are formed so that control of the switching operations of the combinations are contradictorily performed.

The output voltage from the DC-AC converter 4 is supplied to the discharge lamp 9 through an AC output line extended from each of the connection points A and B. When lighting of the discharge lamp 9 is started, a high-voltage starting pulse (or turning-on pulse) must be superimposed on the output of the DC-AC converter 4 so as to be supplied to the discharge lamp 9. Therefore, the starting circuit 5 is provided.

The anomaly detector 6 is a circuit provided to protect the circuit by detecting an anomalous state of the discharge-lamp lighting circuit 1. When the anomaly detector 6 detects an anomalous state of an input voltage value or an input current value from the DC power source 2, the output (the voltage or the electric current) of the DC-AC converter 4, or the state of the discharge lamp 9, the anomaly detector 6 stops the operation of the discharge-lamp lighting circuit 1.

The operation of the circuit can be stopped by, for example, a method with which supply of electric power from the DC power source 2 to the sections following the switching power source portion 3 is stopped or by a method with which the operation of the DC-AC converter 4 is stopped. The latter method, with which the switching operation of the switching device $4si$ (i=1 to 4) is stopped, is executed such that, for example, the switching devices $4s1$ and $4s3$ in the higher stage are switched off and the switching devices $4s2$ and $4s4$ are switched on.

A signal, used as a basic signal by the anomaly detector 6 to determine an anomalous state, may be a detection signal obtainable by a detector disposed in the starting circuit 5 and arranged to detect the tube voltage or the tube current of the discharge lamp 9. As an alternative to this, the signal may be a signal obtainable from a detector included in the switching power source portion 3 to obtain a similar detection signal. Since the present invention is not limited to the method and the circuit structure for detecting an anomalous state, the method and the structure are omitted from description. For example, these structures are shown in FIG. 2 of (for example, Japanese Patent Application No. 1-318481 (Japanese Patent Laid-Open No. 3-179694) and FIGS. 4 and 5 of Japanese Patent Application No. 9-125418 (Japanese Patent Laid-Open No. 10-312896).

The current detector 7 detects whether or not an electric current is flowing in the full bridge circuit in a state after the operation of the discharge-lamp lighting circuit 1 has been stopped because the anomaly detector 6 has detected an anomalous state of the discharge-lamp lighting circuit 1. The current detector 7 is disposed on the output line LN2 of the switching power source portion 3 in the structure shown in FIG. 1. The current detector 7 comprises a shunt resistance for performing current-voltage conversion. The current detector 7 is not limited to the shunt resistance. As a matter of course, any one of a variety of detectors (a current transformer or the like) capable of detecting an electric current may be employed. A detection signal obtained by the current detector 7 is supplied to the device-stage determining circuit 8. When the foregoing signal is supplied to the anomaly detector 6, the signal can be used as basic information for determining an anomalous state.

The device-stage determining circuit 8 determines an ON/OFF state of the switching device $4si$ (i=1 to 4) when an anomalous state of the discharge-lamp lighting circuit 1 has been detected. The device-stage determining circuit 8 is supplied with a signal (a determination signal indicating whether or not an anomalous state of the lighting circuit has occurred) from the anomaly detector 6 and a detection signal obtained by the current detector 7. When an electric current has been detected in the full bridge circuit by the current detector 7, the device-stage determining circuit 8 supplies a control signal to the operating circuit $4a$ of the full bridge circuit to switch on the switching devices $4s1$ and $4s3$ of the plural pairs of the switching devices $4si$ (i=1 to 4) disposed in the higher stage. Moreover, the device-stage determining circuit 8 switches off the switching devices $4s2$ and $4s4$ disposed in the lower stage.

When occurrence of an anomalous state has been communicated to the device-stage determining, circuit 8 in response to the signal supplied from the anomaly detector 6 and an electric current detected by the current detector 7 has been determined as a sign of the passing current, the state of the switching devices of the full bridge circuit is set as follows: the devices in the higher stage are switched on and those in the lower stage are switched off. Hence it follows that any passing current does not flow if rupture of the device in the higher stage occurs because of a short circuit.

Figure 3:
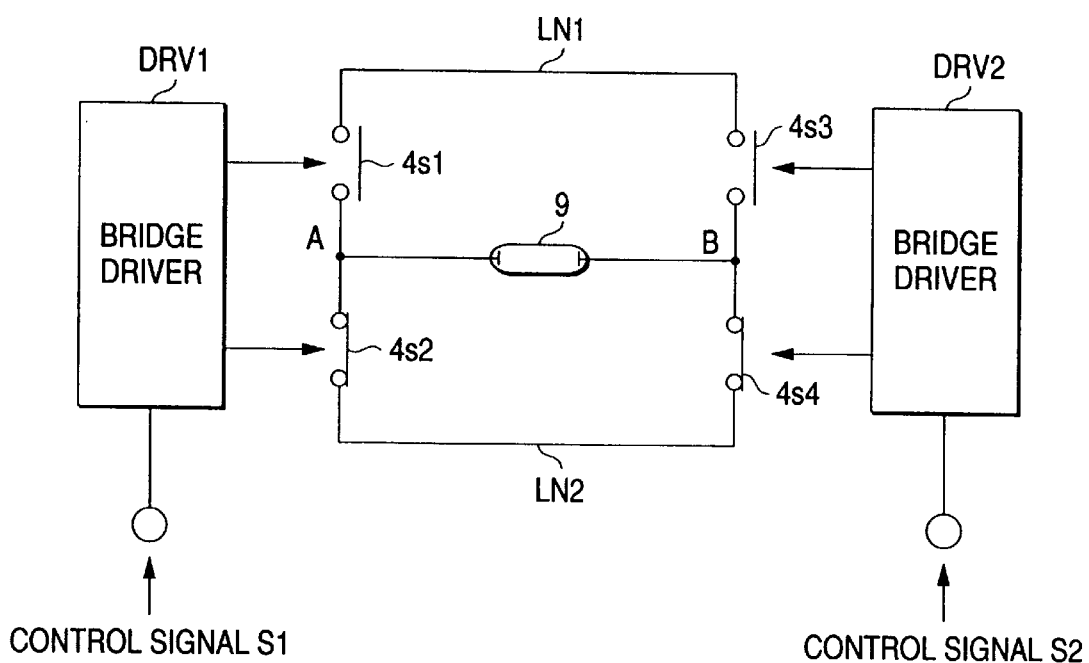
FIG. 3 is a diagram showing an example of the structure of a full bridge circuit.
Figure 4:
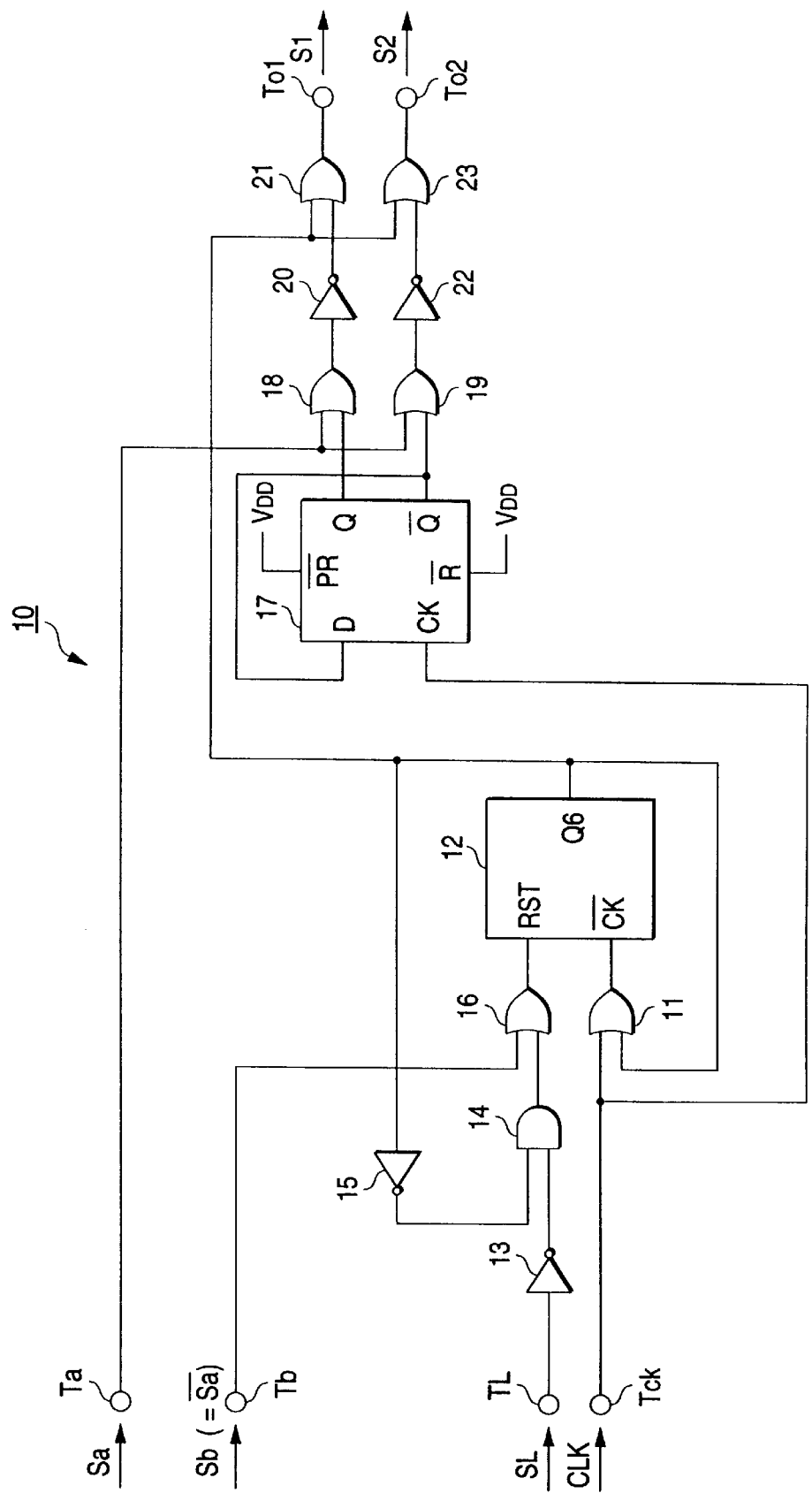
FIG. 4 is a diagram showing an example of a circuit for generating control signals S1 and S2.
Figure 5:
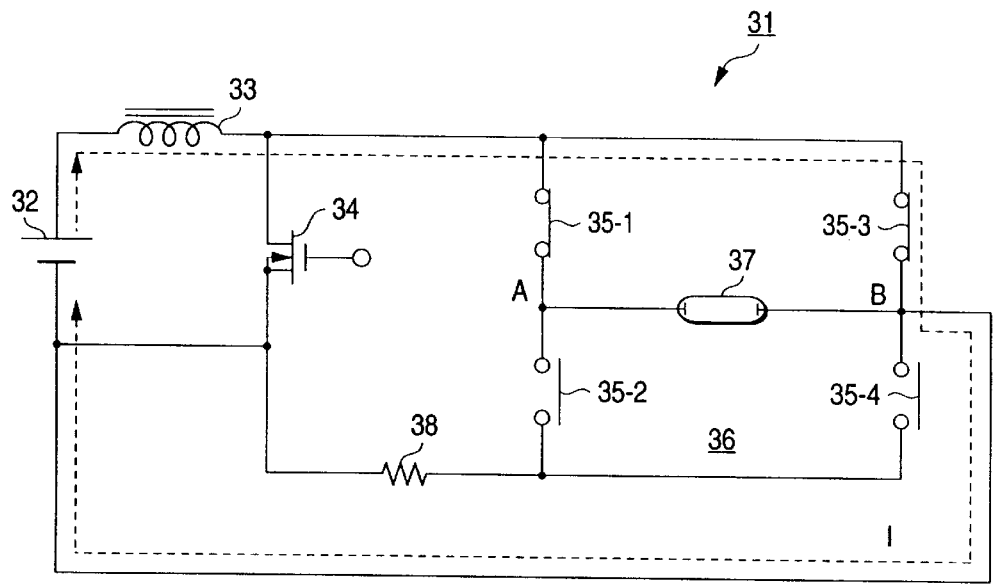
FIG. 5 is a circuit diagram showing an equivalent circuit of a conventional example of a circuit structure.
Figure 6:
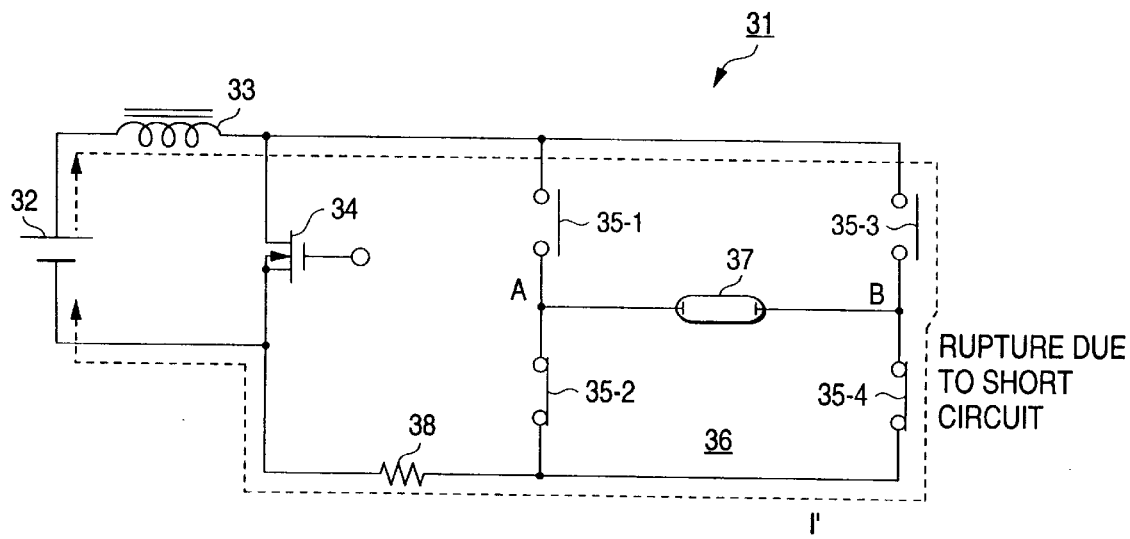
FIG. 6 is a diagram showing problems experienced with the conventional structure.

FIGS. 3 and 4 show examples of essential portions of the circuit. FIG. 3 shows a full bridge circuit, and FIG. 4 shows an example of a circuit including the device-stage determining circuit 8.

Referring to FIG. 3, two bridge drivers DRV1 and DRV2 are provided. The bridge driver DRV1 is supplied with control signal "S1" to control the operations of the switching devices $4s1$ and $4s2$. The other bridge driver DRV2 is supplied with control signal "S2" to control the operations of the switching devices $4s3$ and $4s4$.

The bridge driver DRV1 is structured as follows: when the control signal S1 is H (high) level, the device $4s1$ is switched on and the device $4s2$ is switched off. When the signal S1 is L (low) level, the device $4s1$ is switched off and the device $4s2$ is switched on. The bridge driver DRV2 is structured as follows: when the control signal S2 is L level, the device $4s3$ is switched on and the device $4s4$ is switched off. When the signal S2 is H level, the device $4s3$ is switched off and the device $4s4$ is switched on. When control is performed in a period in which the discharge lamp 9 is being lit normally such that the ON states of the devices $4si$ (i=1 to 4) do not overlap and no deadtime exists, the phases of the signal S1 and S2 have the inversion relationship. Therefore, the device $4s1$ is switched on and the device $4s2$ is switched off (since the control signal S2 is L level, the devices $4s3$ and $4s4$ are brought to the following states: the device $4s3$ is switched off and the device $4s4$ is switched on) in a period in which the control signal S1 is H level. The device $4s1$ is then switched off and the device $4s2$ is switched on (since the control S2 is H level, the devices $4s3$ and $4s4$ are brought to the following states: the device $4s3$ is switched on and the device $4s4$ is switched off) in a period in which the control signal S1 is L level.

The inverse relationship between the phases of the control signals S1 and S2 is ended, to set both the two signals S1 and S2 to be L level, when an anomalous state of the circuit has been detected by the anomaly detector 6 (in a state in which no electric current is detected by the current detector 7). In addition, the devices $4s1$ and $4s3$ in the higher stage are switched off. Thus, generation of passing current when a ground fault has occurred can be prevented.

When an electric current is detected by the current detector 7 after an anomalous state of the circuit has been detected, both of the control signals S1 and S2 are made to be H level signals. Thus, the devices $4s2$ and $4s4$ in the lower stage are switched off. Therefore, generation of a passing current owing to a rupture of the device in the higher stage caused from short circuit can be prevented.

When a rupture of the device in the lower stage has occurred because of a short circuit, both the control signals S1 and S2 are made to be L level signals. In a state where the devices in the higher stage are normal, no electric current is detected by the current detector 7 (that is, the passing current cannot be prevented when rupture of both the devices in the higher stage and in the lower stage has occurred due to short circuiting).

FIG. 4 shows a generating (a logic) circuit 10 for generating the control signals S1 and S2. A terminal TL is supplied with a lighting determination signal "SL" (whereby if a tube current is detected in a lighting state, the level is made to be H level, or the level is made to be L level when any tube current is not detected in a turned-off state or a non-lighting state) transmitted from the discharge lamp 9 in response to a detection signal from the current detector 7 (a shunt resistance or the like). Although a method with which the detection signal of the current detector 7 is directly used may be employed, the lighting determination signal that responds to the detection signal is a signal which can be used widely when an anomalous state is determined. Therefore, use of the lighting determination signal as the current detection signal enables the detection circuit to be used commonly and allows cost to be reduced.

A terminal Ta is supplied with an anomalous determination signal "Sa" (which is made to be H level in an anomalous state and made to be L level in a normal state) from the anomaly detector 6. A terminal Tb is supplied with an inverted signal "Sb" (which is made to be L level in an anomalous state and made to be H level in a normal state) of the anomalous detection signal Sa.

A terminal Tck is supplied with a clock signal "CLK" (for example, about 1 kHz) from a clock-signal generating portion (not shown). The clock signal CLK is transmitted to a clock input terminal (a bar is added to the position above the terminal "CK" in the drawing) of a counter 12 through a 2-input OR (logical OR) gate 11. The other input terminal of the 2-input OR gate 11 is supplied with an output signal from a terminal Q6 of the counter 12.

A reset terminal RST of the counter 12 is supplied with a result of a logical operation of the signals SL and Sb and an output signal from the terminal Q6 of the counter 12. That is, the structure is arranged such that the signal SL is input via a 2-input AND (a logical product) gate 14 through a NOT gate (NOT) 13. Another input terminal of the 2-input AND gate 14 is supplied with an output signal from the terminal Q6 of the counter 12 through a NOT gate 15. The logical sum of the output signal from the 2-input AND gate 14 and the signal Sb is obtained by a 2-input OR gate 16 so as to be supplied to a reset terminal (RST) of the counter 12.

The D flip flop 17 has a clock input terminal (CK) to which a clock signal CLK is supplied from the terminal Tck. A D input terminal (D) of the D flip flop 17 is supplied with a bar Q output ("Q NOT") from the D flip flop 17. Note that preset terminal (PR) and a reset terminal (R) are supplied with a predetermined power supply voltage "VDD".

An output Q from the D flip flop 17 is supplied to one of input terminals of a 2-input OR gate 18. Another input terminal of the 2-input OR gate 18 is supplied with a signal Sa. An output bar Q from the D flip flop 17 is supplied to one of input terminals of a 2-input OR gate 19. Another input terminal of the 2-input OR gate 19 is supplied with the signal Sa.

An output signal from the 2-input OR gate 18 is, through a NOT gate 20, supplied to one of input terminals of a 2-input OR gate 21. Another input terminal of the 2-input OR gate 21 is supplied with an output signal (an output from the terminal Q6) of the counter 12. The output signal from the 2-input OR gate 21 is output through a terminal To1 to serve as the control signal S1.

An output signal from the 2-input OR gate 19 is, through a NOT gate 22, supplied to one of input terminals of a 2-input OR gate 23. Another input terminal of the 2-input OR gate 23 is supplied with an output signal (an output from the terminal Q6) from the counter 12. The output signal from the 2-input OR gate 23 is output through the terminal To2 to serve as the control signal S2.

In the circuit 10, the signal Sa is L level and the signal Sb is H level in a normal operation state and the counter 12 is brought to a reset state. Thus, the clock signal CLK is divided to half by the D flip flop 17 so as to be a signal of about 500 Hz. A NOT (or inversion) signal of the output Q of the D flip flop 17 is obtained as the control signal S1. A NOT signal of the bar Q signal is obtained as the control signal S2.

When an anomalous state of the circuit has been detected, the status value of the lighting determination signal SL is classified into the two cases below.

(i) a case where the signal Sa is H level and the signal SL is L level; and (ii) a case where the signal Sa is H level and the signal SL is H level.

In the case (i), the outputs of the 2-input OR gates 18 and 19 are forcibly made to be H level. NOT signals (L level signals) of the H level signals are supplied to the 2-input OR gates 21 and 23. When the signal SL is L level and the output signal from the terminal Q6 of the counter 12 is L level, the reset state of the counter 12 is maintained. Therefore, L level signal output from the counter 12 is supplied to the 2-input OR gates 21 and 23 and both of the control signals S1 and S2 are made to be L level.

In the case of (ii), the signal SL is H level, the output signals from the 2-input AND gate 14 and the 2-input OR gate 16 are made to be L level so as to be supplied to the reset terminal of the counter 12. Thus, the counter 12 is operated. After a predetermined time has lapsed (for example, 32 milliseconds), the output of the terminal Q6 is made to be H level. The H level output is transmitted to the 2-input OR gates 21 and 23 so that both of the control signals S1 and S2 are made to be H level.

When the signal SL is made to be L level before the output of the terminal Q6 of the counter 12 is made to be H level, the counter 12 is reset. Thus, both of the control signals S1 and S2 are made to be L level.

The counter 12 is provided to recognize whether or not an electric current detected by the current detector 7 has been continued for a predetermined time or longer. If continuation of the electric current for the predetermined time or longer is detected, a determination is made that the passing current has been generated. Thus, a H level signal is output as a determination signal. If continuation of the flow of the electric current for a time shorter than the predetermined time is detected, the current is determined as a current generated temporarily. Therefore, a determination is made that the passing current is not present and a L level signal is output as a determination signal. As a result of the determination, frequent occurrence of erroneous detection can be prevented.

As described above, it is preferable that a time measurement device for determining duration of continuation of the flow of the electric current detected by the current detector 7 is provided. Thus, when the current flows for a predetermined time or longer, the device-stage determining circuit 8 switches on the switching devices of the plural pairs of the switching devices constituting the full bridge circuit which are disposed in the higher stage. Moreover, the switching devices disposed in the lower stage are switched off.

A case where input and output stages of a converter are connected in a DC (Direct Current) manner as shown in FIGS. 2A and 2B is considered. When a following full bridge circuit encounters a ground fault, flow of a passing current as described in FIG. 5 can be prevented as follows: when an anomalous state of the discharge-lamp lighting circuit 1 has been detected by the anomaly detector 6 and no electric current has been detected by the current detector 7, the device-stage determining circuit 8 performs the following operation. That is, the device-stage determining circuit 8 switches off the switching devices of the plural pairs of the switching devices constituting the full bridge circuit which are disposed in the higher stage. Moreover, the device-stage determining circuit 8 switches off the switching devices disposed in the lower stage.

As described above, when an electric current which flows in the full bridge circuit has been detected as a sign of the passing current, the switching devices of the plural pairs of the switching devices, constituting the full bridge circuit and disposed in the higher stage are switched on. Moreover, the switching devices disposed in the lower stage are switched off. Thus, the route for the passing current can be obstructed. Therefore, heating and firing of the switching device can be prevented.

According to another aspect of the invention, when an electric current detected by the current detection means flows for a predetermined time or longer, the switching devices of the plural pairs of the switching devices, constituting the full bridge circuit and disposed in the higher stage, are switched on. Moreover, the switching devices disposed in the lower stage are switched off. Therefore, an erroneous shorting determination can be prevented and obstruction of the route for the passing current can reliably be performed.

According yet another aspect of the invention, when an anomalous state of the lighting circuit has been detected and no electric current has been detected by the current detector, the switching devices of the plural pairs of the switching devices, constituting the full bridge circuit and disposed in the higher stage, are switched on. Moreover, the switching devices disposed in the lower stage are switched off. Thus, the route for the passing current which flows when a ground fault has occurred can be obstructed.

What is claimed is:

1. A discharge-lamp lighting circuit incorporating a full bridge circuit having a DC-AC converter arranged to convert DC voltage into AC voltage and including a plurality of pairs of switching devices, said discharge-lamp lighting circuit comprising:

anomaly detecting means for detecting an anomalous state of said lighting circuit;

current detecting means for detecting whether or not an electric current is flowing in said full bridge circuit after the operation of said lighting circuit has been stopped owing to detection of an anomalous state of said lighting circuit by said anomaly detecting means; and device-state determining means for switching on switching devices, of the plural pairs of said switching devices, configured as said full bridge circuit and positioned in a higher stage, and for switching off switching devices which are positioned in a lower stage.

2. A discharge-lamp lighting circuit according to claim 1, further comprising:

time measuring means for measuring duration for which an electric current detected by said current detecting means flows, wherein when the electric current flows for a time not shorter than a predetermined time, said device-state determining means switches on the switching devices of the plural pairs of said switching devices that are configured as said full bridge circuit and positioned in the higher stage, and switches off said switching devices positioned in the lower stage.

3. A discharge-lamp lighting circuit according to claim 1, wherein when said anomaly detecting means has detected the anomalous state of said lighting circuit and said current detecting means has not detected any current, said device-state determining means switches off said switching devices of the plural pairs of said switching devices that are configured as said full bridge circuit and positioned in the higher stage, and switches on said switching devices positioned in the lower stage.

4. A discharge-lamp lighting circuit incorporating a full bridge circuit having a DC-AC converter arranged to convert DC voltage into AC voltage and including a plurality of pairs of switching devices, said discharge-lamp lighting circuit comprising:

an anomaly detector operative to detect an anomalous state of said lighting circuit;

a current detector operative to detect whether or not an electric current is flowing in said full bridge circuit after the operation of said lighting circuit has been stopped because an anomalous state of said lighting circuit has been detected by said anomaly detector, the current detector generating a current detection signal when the anomalous state is detected; and, a device-state determining circuit that, when said device-state determining circuit receives said current detection signal, switches on switching devices, of the plural pairs of said switching devices, that are configured as said full bridge circuit and positioned in a higher stage, and that switches off switching devices which are positioned in a lower stage.

5. A discharge-lamp lighting circuit according to claim 4, further comprising:

a time measurement circuit operative to measure duration for which an electric current detected by said current detector flows, wherein when the electric current flows for a time not shorter than a predetermined time, said device-state determining circuit switches on the switching devices of the plural pairs of said switching devices that are configured as said full bridge circuit and positioned in the higher stage, and switches off said switching devices positioned in the lower stage.

6. A discharge-lamp lighting circuit according to claim 4, wherein when said anomaly detector has detected the anomalous state of said lighting circuit and said current detector has not detected any current, said device-state determining circuit switches off said switching devices of the plural pairs of said switching devices that are configured as said full bridge circuit and positioned in the higher stage, and switches on said switching devices positioned in the lower stage.

* * * * *